US009531148B2

(12) United States Patent
Xuan et al.

(10) Patent No.: US 9,531,148 B2
(45) Date of Patent: Dec. 27, 2016

(54) LASER RESONATOR GAIN MEDIUM SECUREMENT

(75) Inventors: Rongwei Jason Xuan, Fremont, CA (US); Russel E. Klein, San Jose, CA (US); Michael A. Scott, Manteca, CA (US); James E. Johnson, Hayward, CA (US); Edward D. Reed, Jr., Sunnyvale, CA (US); Xirong Yang, Fremont, CA (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 404 days.

(21) Appl. No.: 12/980,014

(22) Filed: Dec. 28, 2010

(65) Prior Publication Data

US 2011/0158271 A1      Jun. 30, 2011

Related U.S. Application Data

(60) Provisional application No. 61/290,603, filed on Dec. 29, 2009.

(51) Int. Cl.
| | |
|---|---|
| *H01S 3/04* | (2006.01) |
| *H01S 3/06* | (2006.01) |
| *H01S 3/02* | (2006.01) |
| *H01S 3/081* | (2006.01) |
| *H01S 3/109* | (2006.01) |
| *H01S 3/11* | (2006.01) |

(52) U.S. Cl.
CPC ............ *H01S 3/061* (2013.01); *H01S 3/0407* (2013.01); *H01S 3/025* (2013.01); *H01S 3/0817* (2013.01); *H01S 3/109* (2013.01); *H01S 3/11* (2013.01)

(58) Field of Classification Search
CPC ......... H01S 3/0407; H01S 3/025; H01S 3/061
USPC ...................................... 372/34, 35
See application file for complete search history.

(56) References Cited

U.S. PATENT DOCUMENTS

| | | | |
|---|---|---|---|
| 3,555,449 A | 1/1971 | Osial et al. | |
| 3,665,337 A * | 5/1972 | Koechner | 372/33 |
| 5,025,446 A | 6/1991 | Kuizenga | |
| 5,080,521 A * | 1/1992 | Quaile | 403/326 |
| 5,852,626 A | 12/1998 | Reed | |
| 5,936,984 A | 8/1999 | Meissner et al. | |
| 6,026,109 A | 2/2000 | Micke et al. | |
| 6,999,839 B2 | 2/2006 | Vetrovec | |
| 2004/0240496 A1* | 12/2004 | Fujikawa et al. | 372/34 |

* cited by examiner

*Primary Examiner* — Yuanda Zhang
*Assistant Examiner* — Michael Carter
(74) *Attorney, Agent, or Firm* — Bookoff McAndrews, PLLC

(57) ABSTRACT

A laser resonator comprises a cylindrical gain medium, a cooling system and a coupling member. The cylindrical gain medium comprises a central axis, an outer side surface, two opposing end faces and a first depression in the outer side surface. The cooling system comprises a cooling jacket disposed around the gain medium that defines a cooling cavity, in which cooling fluid is guided over the side surface of the gain medium. In one embodiment, the cooling jacket comprises a second depression. The coupling member is received within the first and second depressions. Movement of the first depression along the central axis relative to the cooling jacket is restricted by the coupling member.

20 Claims, 4 Drawing Sheets

LASER RESONATOR GAIN MEDIUM SECUREMENT

CROSS-REFERENCE TO RELATED APPLICATION

The present application is based on and claims the benefit of U.S. provisional patent application Ser. No. 61/290,603, filed Dec. 29, 2009, the content of which is hereby incorporated by reference in its entirety.

FIELD OF THE INVENTION

Embodiments of the invention relate to laser gain media, and more particularly to securing laser gain media in a laser resonator.

BACKGROUND

Laser systems typically use a cylindrically shaped gain medium (laser rod) to generate a laser output. The gain medium is pumped by a light input from an optical pump source to excite the gain medium. A laser resonator is formed whereby a pulsed or continuous wave intracavity laser beam is generated and amplified by the excited gain medium as it travels through the gain medium. A portion of the intracavity laser beam is coupled out of the laser resonator to form the laser output.

Heat is generated during excitation of the gain medium. A cooling system is used to maintain the gain medium within a desired operating temperature range. Such cooling systems typically include a cooling jacket that surrounds the gain medium. Cooling liquid is circulated through the cooling jacket to extract heat from the gain medium.

In high power laser systems (e.g., more than 100 watts), power cycling of the optical pump source causes the gain medium to undergo significant temperature changes. Such temperature changes result in the thermal expansion and contraction of the gain medium, which can cause failure of the laser system as a result of movement of the gain medium within the cooling system.

SUMMARY

Embodiments in the invention are directed to a laser resonator and method. One embodiment of the laser resonator comprises a cylindrical gain medium, a cooling system and a coupling member. The cylindrical gain medium comprises a central axis, an outer side surface, two opposing end faces and a first depression in the outer side surface. The cooling system comprises a cooling jacket disposed around the gain medium that defines a cooling cavity, in which cooling fluid is guided over the side surface of the gain medium. In one embodiment, the cooling jacket comprises a second depression. The coupling member is received within the first and second depressions. Movement of the first depression along the central axis relative to the cooling jacket is restricted by the coupling member.

In one embodiment of the method, a laser resonator is provided that comprises a cylindrical gain medium and a cooling system. The gain medium comprises a central axis, an outer side surface, two opposing end faces and a first depression in the outer side surface. The cooling system comprises a cooling jacket disposed around the gain medium. In one embodiment, the cooling jacket comprises a second depression. The coupling member is positioned within the first and second depressions. Cooling fluid is circulated through the cooling cavity. The gain medium is excited. A laser beam inside the laser resonator is generated responsive to exciting the gain medium. The gain medium is thermally expanded along the central axis responsive to exciting the gain medium. The position of the first depression relative to the second depression of the cooling jacket is maintained using the coupling member.

Other features and benefits that characterize embodiments of the present invention will be apparent upon reading the following detailed description and review of the associated drawings.

DETAILED DESCRIPTION OF ILLUSTRATIVE EMBODIMENTS

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure or described herein.

Figure 1:
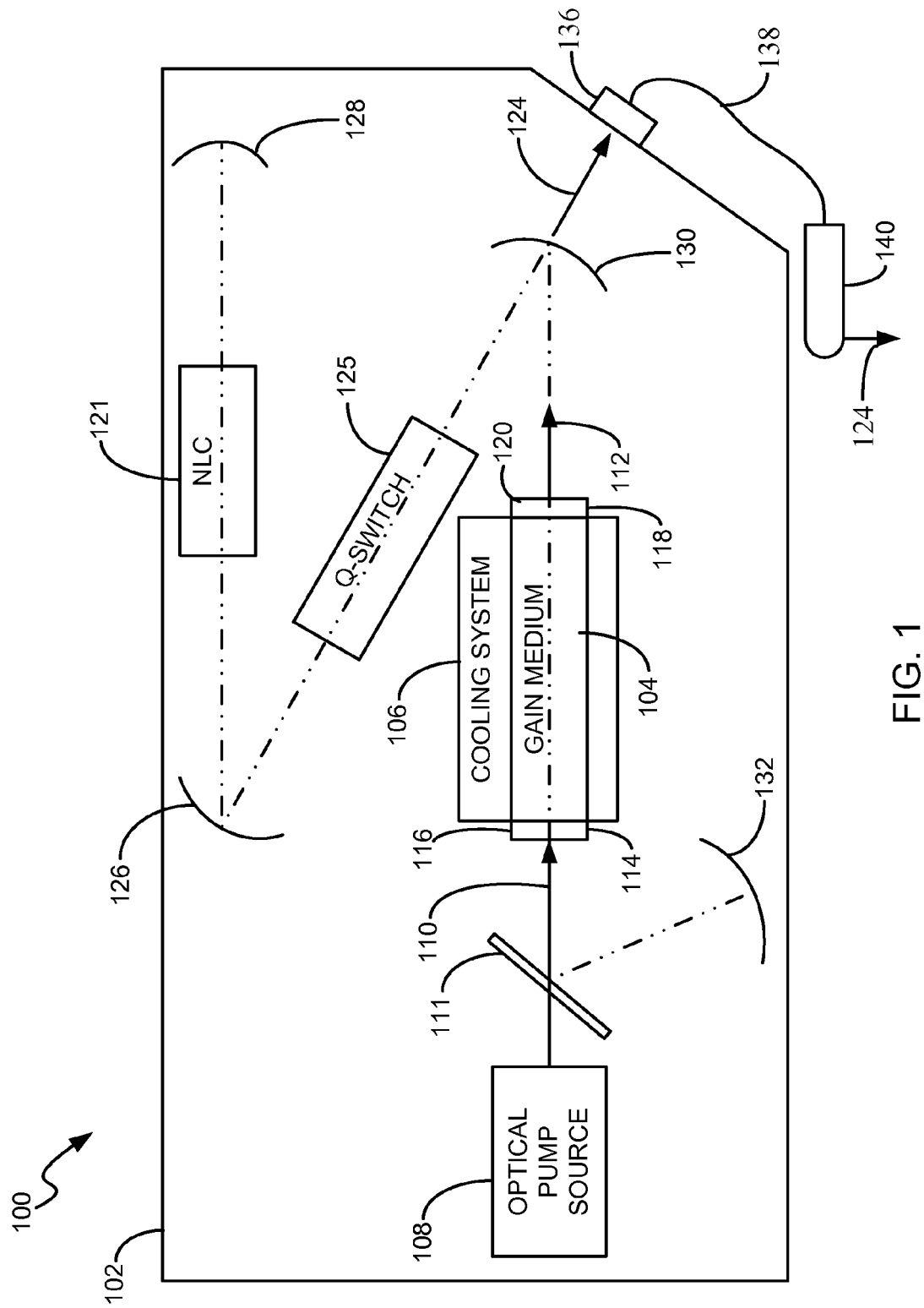
FIG. 1 is a schematic illustration of an exemplary laser system in accordance with embodiments of the invention.

FIG. 1 is a schematic illustration of an exemplary laser system 100 in accordance with embodiments of the invention. One embodiment of the laser system 100 includes a laser resonator 102 in accordance with embodiments of the invention. In one embodiment, the laser resonator 102 includes a gain medium or laser rod 104, a cooling system 106 and an optical pump source 108.

In one embodiment, the gain medium 104 is a doped crystalline host that is configured to absorb pump energy 110 generated by the optical pump source 108 having a wavelength that is within an operating wavelength (i.e., absorption spectra) range of the gain medium 104. The optical pump source 108 may deliver the pump energy 110 in accordance with conventional techniques. In one embodiment, the gain medium 104 is end-pumped by the pump energy 110, which may be transmitted through a folding mirror 111 that is transmissive at the wavelength of the pump energy 110. In accordance with another embodiment, the gain medium 104 is side-pumped by the pump energy 110. The excitation of the gain medium 104 responsive to the absorption of the pump energy 110 causes the gain medium to output laser light 112.

The excitation of the gain medium 104 responsive to the absorption of the pump energy 110 also generates heat. The cooling system 106 is configured to cool the gain medium 104 to maintain the temperature of the gain medium 104 within a desired operating temperature range. In one embodiment, the cooling system 106 cools the gain medium 104 using a liquid, such as water, as will be discussed below in greater detail. Other suitable cooling systems may also be used.

In one embodiment, the gain medium 104 includes an undoped end cap 114 bonded on a first end 116 of the gain medium 104, and an undoped end cap 118 bonded on a second end 120 of the gain medium 104. In one embodiment, the end 120 is coated so that it is reflective at the pump energy wavelength, while transmissive at a resonant mode of the system 100. In this manner, the pump energy that is unabsorbed at the second end 120 is redirected back through the gain medium 104 to be absorbed.

In one embodiment, the gain medium 104 comprises a yttrium-aluminum-garnet crystal (YAG) rod with neodymium atoms dispersed in the YAG rod to form a Nd:YAG gain medium 104. The Nd:YAG gain medium 104 converts the pump light into the laser light 112 having a primary wavelength of 1064 nm. The laser resonator 102 generates the second harmonic of the 1064 nm laser light 124 having a wavelength of 532 nm. One advantage of the 532 nm wavelength is that it is strongly absorbed by hemoglobin in blood and, therefore, is useful in medical procedures to cut, vaporize and coagulate vascular tissue. Embodiments of the laser resonator include the use of other conventional gain mediums 104 and non-linear crystals 121.

In one embodiment, the laser resonator 102 includes a Q-switch 125 that operates to change the laser beam 112 into a train of short pulses with high peak power to increase the conversion efficiency of the second harmonic laser beam.

In one embodiment, the laser resonator 102 includes one or more mirrors for routing the output lasers 112 and 124 through the laser resonator 102. In one exemplary embodiment, the laser resonator 102 includes reflecting mirrors 126, 128 and 132, folding mirror 111, and output coupler 130. The mirrors 111, 126, 128 and 132, and output coupler 130 are highly reflective at the primary wavelength (e.g., 1064 nm). The output coupler 130 is highly transmissive at the second harmonic output wavelength (e.g., 532 nm). The primary wavelength laser beam (e.g., 1064 nm) inside the resonator 102 bounces back and forth along the path between the mirrors 128 and 132, passing through the gain medium 104 and the non-linear crystal 121 to be frequency doubled to the second harmonic output wavelength (e.g., 532 nm) beam, which is discharged through output coupler 130 as the output laser 124. The Z-shaped resonant cavity can be configured as discussed in U.S. Pat. No. 5,025,446 by Kuizenga, imaging the resonant mode at one end of the gain medium 104 at the non-linear crystal 121. The configuration described is stable and highly efficient for frequency conversion. The configuration shown in FIG. 1 using the Nd:YAG gain medium 104 and a LBO non-linear crystal 121 produces a frequency converted output laser 124 having a wavelength of 532 nm, as indicated above.

In one embodiment, the laser resonator 102 includes an optical coupler 136 that is connected to a waveguide, such as an optical fiber 138. In one embodiment, the system 100 includes an optical device 140, such as a surgical laser probe or other device, that delivers the output laser 124 to a desired target.

Figure 2:
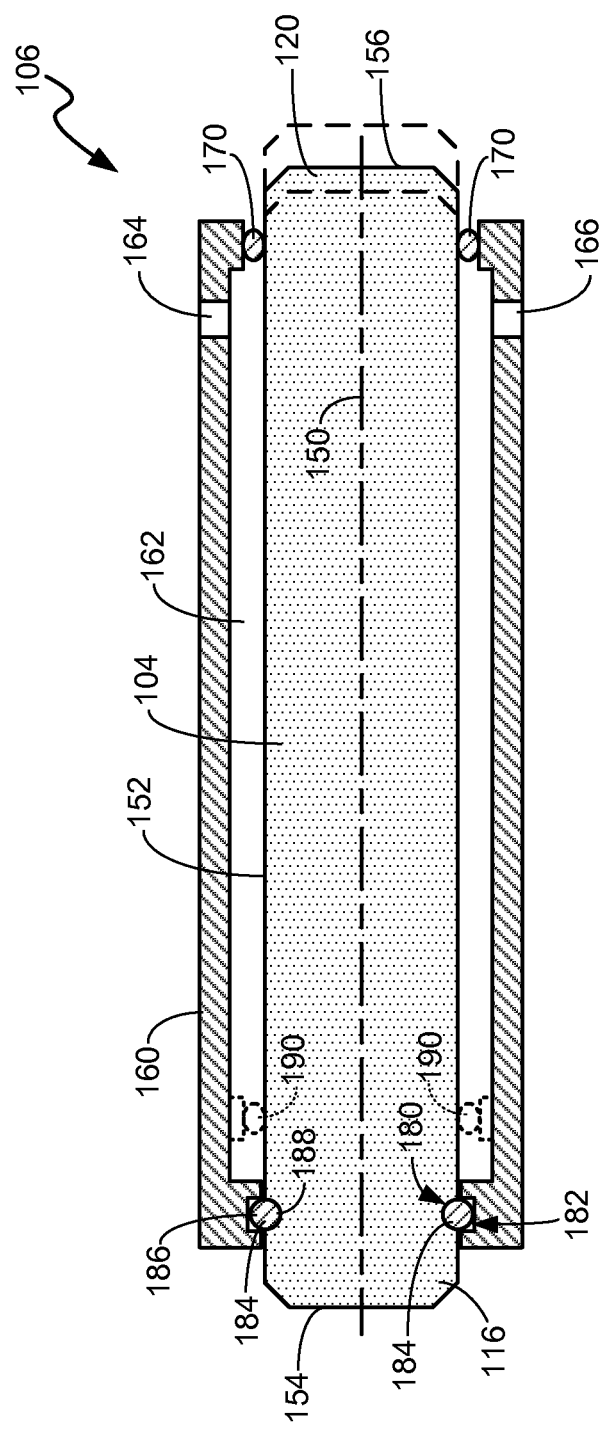
FIG. 2 is a simplified cross-sectional view of the gain medium within a cooling system, in accordance with embodiments of the invention.

FIG. 2 is a simplified cross-sectional view of the gain medium 104 within the cooling system 106. One embodiment of the gain medium 104 includes a central axis 150, an outer side surface 152 and opposing end faces 154 and 156 at the ends 116 and 120, respectively.

One embodiment of the cooling system 106 includes a cooling jacket 160 that is disposed around the gain medium 104. In one embodiment, the cooling jacket 160 defines a cooling cavity 162 around the outer side surface 152. The cooling jacket 160 includes a fluid input port 164 and an output port 166 for circulating cooling fluid, such as water, along the length of the side surface 152 of the gain medium 104.

In one embodiment, the ends of the cooling cavity 162 adjacent the ends 116 and 120 of the gain medium comprise seals that prevent the cooling liquid from leaking out of the cavity 162. Such seals may be formed in accordance with conventional techniques. In one embodiment, an O-ring 170 is compressed between the cooling jacket 160 and the outer side surface 152 of the gain medium adjacent the end 120, as shown in FIG. 2. In one embodiment, the outside surface 152 of the gain medium 104 at the location of the O-ring 170 is a smooth cylindrical surface.

During power cycling of the pump energy 110, in which the amount of pump energy 110 is adjusted or switched on and off, the amount of heating of the gain medium 104 changes thereby changing the temperature of the gain medium 104. Such temperature changes cause the gain medium 104 to thermally expand or contract. In high power laser systems (e.g., greater than 100 W), the thermal expansion and contraction of the gain medium 104 over time can shift the position of the gain medium within the cooling jacket 160, which can lead to a failure of the laser system 100. Embodiments of the invention operate to prevent such a failure from occurring.

In one embodiment, the gain medium 104 includes a depression 180 formed in the outer side surface 152. In one embodiment, the cooling jacket 160, or other component of the cooling system 106, includes a depression 182 located adjacent the depression 180. In one embodiment, a coupling member 184 is received within the depressions 180 and 182. The coupling member 184 operates to restrict the movement of the gain medium 104 at the first depression 180 along the central axis 150 relative to the cooling jacket 160 at the depression 182. Thus, when the depression 180 is located adjacent the end 116, the receipt of the coupling member 184 within the depressions 180 and 182 restricts movement of the end 116 of the gain medium 104 at the site of the depression 180 along the central axis 150 relative to the coupling jacket 160.

As a result, as the gain medium 104 undergoes thermal expansion and contraction responsive to the heating and cooling of the gain medium 104 from cycling or adjusting the pump energy 110, movement of the end 116 of the gain medium 104 along a central axis 150 relative to the cooling jacket 160 is restricted by the coupling member 184 within the depressions 180 and 182, while the end 120 of the gain medium 104 is free to move along the central axis 150 relative to the cooling jacket 160 by overcoming the resistance to such movement caused by the O-ring 170, as illustrated by the phantom lines in FIG. 2.

The depressions 180 and 182 can take on many different forms. In general, the depression 180 is a recess within the otherwise substantially smooth and cylindrical outer side surface 152 of the gain medium 104. In one embodiment, the depression 180 is in the form of a groove 180 that preferably comprises a continuous smooth surface, such as a hemispherical cross-section, for example. In other embodiments, the groove 180 can take on other cross-sectional shapes such as triangular, rectangular, etc. In one embodiment, the groove 180 is an annular groove that is substantially coaxial to the central axis 150 of the gain medium 104.

In one embodiment, the depression 180 comprises multiple depressions in the outer side surface 152 of the gain medium that are displaced from each other, such as multiple groove sections, dimples, etc. The plurality of depressions 180 may be angularly displaced about the surface 152 of the gain medium about the axis 150 and/or axially displaced from each other along the axis 150. In one embodiment, the multiple depressions are substantially aligned in a plane that is perpendicular to the central axis 150.

The depression 182 of the cooling jacket 160 can also take on various forms. The form of the depression 182 may be in accordance with the form of the depression 180. Accordingly, embodiments of the depression 182 include a groove, such as that shown in FIG. 2. One embodiment of the groove 182 is an annular groove that is substantially coaxial to the central axis 150 of the gain medium 104. The depression 182 may also comprise multiple depressions (e.g., multiple groove sections, dimples, etc.) that are displaced angularly from each other around the gain medium 104 about the axis 150 and/or displaced axially from each other in the direction of the axis 150.

The coupling member 184 is generally in a form that can be received within the grooves 180 and 182 and perform the desired movement restriction function. Thus, the particular form of the coupling member 184 can be selected based on the form of the depressions 180 and 182. Those skilled in the art understand that the depressions 180 and 182 and the coupling member 184 can take on numerous shapes, such as the exemplary shapes described above, while providing the desired function of restricting axial movement of the gain medium 104 relative to the cooling jacket 160 at the site of the depression 180.

In addition to having sufficient mechanical strength to hold the gain medium 104 in place relative to the cooling jacket 160, it is desired that the coupling member 184 have a resistance to both the pump energy 110 and the laser light 112. In one embodiment, it is desirable that the coupling member be formed of a material that is useful in forming a seal capable of resisting leaks, such as in a high pressure cooling system. In one embodiment, the coupling member 184 is formed of polytetrafluoroethylene (PTFE). Other suitable materials may also be used to form the coupling member 184.

In one embodiment, the coupling member 184 comprises a compressible member that expands into the depressions 180 and 182 when they are properly aligned. Accordingly, a portion of the coupling member 184 is positioned within the depression 180 and a portion of the coupling member 184 is positioned within the depression 182 when the depressions are properly aligned. Movement of the gain medium 104 along the axis 150 relative to the cooling jacket 160 pulls the portion of the coupling member 184 within the depression 180 in the direction of movement of the gain medium 104. However, this movement is restricted by the portion of the coupling member 184 in the depression 182 of the cooling jacket 160. In this manner, movement of the gain medium 104 along the axis 150 relative to the cooling jacket 160 is restricted by the coupling member 184 at the depression 180.

In one embodiment, the coupling member 184 comprises an O-ring, such as that illustrated in FIG. 2. In accordance with this embodiment, the depression 180 is preferably in the form of the annular groove that receives an inner diameter portion 186 of the O-ring 184, and the depression 182 is in the form of the annular groove, or a series of grooves, that receives an outer diameter portion 188 of the O-ring 184.

Other embodiments of the coupling member 184 include one or more members designed for receipt within the depressions 180 and 182, such as an annular member with protuberances that extend into the depressions 180 and 182, one or more non-annular members, and other shapes.

In one embodiment, the coupling member 184 is bonded to one of the depressions 180 or 182. In one embodiment, the coupling member 184 is integrally formed with the cooling jacket 160 or other structure of the cooling system 106.

In one embodiment, the coupling member 184 is an O-ring that forms a seal of the cooling cavity 162 adjacent the end 116 of the gain medium 104. In accordance with another embodiment, an O-ring 190 is located adjacent the end 116 of the gain medium and forms a seal between the outer side surface 152 of the gain medium and the cooling jacket, as illustrated in phantom lines in FIG. 2. In accordance with this embodiment, the cooling cavity 162 is formed between the seals provided by the O-rings 170 and 190. Thus, the depression 180 of the gain medium 104 lies outside the cooling cavity 162.

Figure 2A:
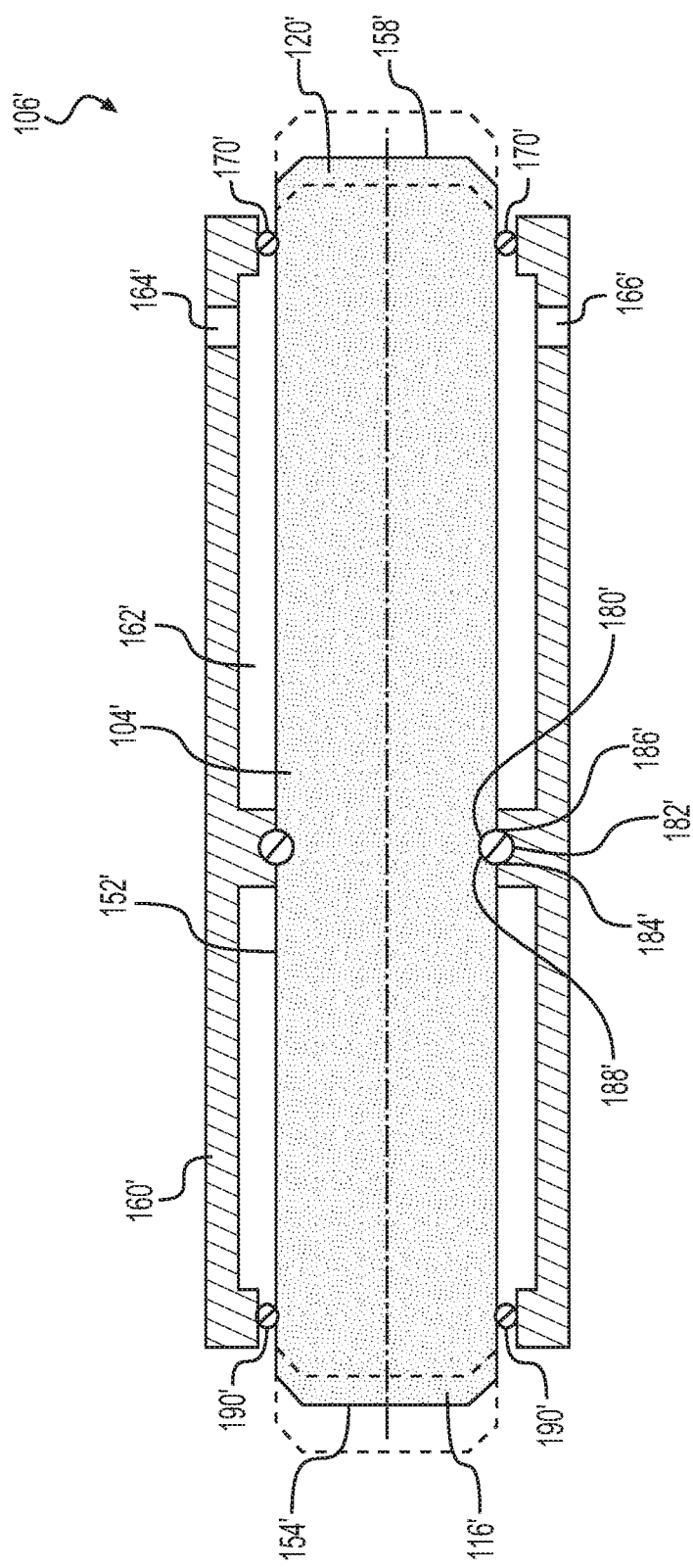
FIG. 2A is another simplified cross-sectional view of the gain medium within a cooling system, in accordance with embodiments of the invention.

An alternative embodiment is shown in FIG. 2A, which depicts a cooling system 106' including counterpart elements to cooling system 106 of FIG. 2, but with a prime designation. In accordance with this alternative embodiment, a depression 180' of a gain medium 104' is located within a cooling cavity 162' between a first seal or O-ring 170' and a second seal or O-ring 190'. A coupling member 184 is placed in cooling cavity 162' between first and second seals 170' and 190' so that a set of opposing ends 116' and 120' (including opposing end faces 154' and 158') of the gain medium 104' are allowed to move relative to a cooling jacket 160'. For example, in FIG. 2A, an outer diameter portion 188' of coupling member 184' is placed in an outer or first depression 180' on the outer surface of pain medium 104', and an inner diameter portion 186' of coupling member 184' is placed in an inner or second depression 182' on the inner surface of cooling cavity 162', such that first depression 180' remains in position within the cooling jacket 160', thus maintaining the gain medium 104' within the cooling jacket 160' over periods of pump energy power cycling. Similar to cooling cavity 162 of FIG. 2, cooling cavity 162' of FIG. 2A may include one or more input ports 164' and output ports 166' for circulating cooling fluid, such as water, along the length of an outer surface 152' of the gain medium 104'.

Figure 3:
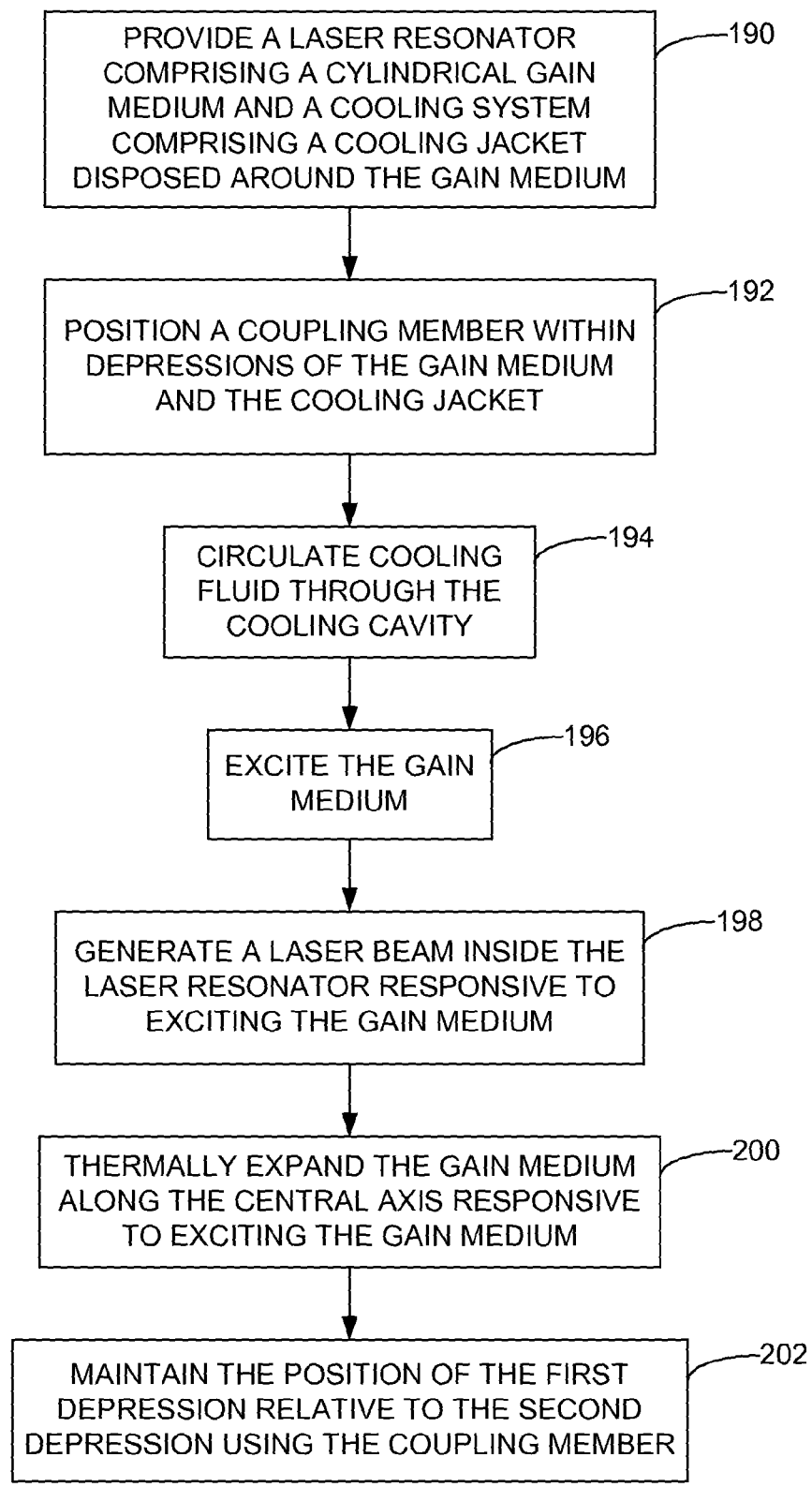
FIG. 3 is a flowchart illustrating a method in accordance with embodiments of the invention.

FIG. 3 is a flowchart illustrating a method in accordance with embodiments of the invention. At 190, a laser resonator 102 is provided comprising a cylindrical gain medium 104 and a cooling system 106 comprising a cooling jacket 160 disposed around the gain medium 104, as illustrated in FIG. 2. In one embodiment, the cylindrical gain medium 104 includes a depression 180 and a cooling jacket 160 includes a depression 182. The depressions 180 and 182 are formed in accordance with embodiments described herein. At 192, a coupling member 184, formed in accordance with embodiments described herein, is positioned within the depressions 180 and 184 of the gain medium 104 and the cooling jacket 160. In one embodiment, the positioning of the coupling member 184 within the depressions 180 and 182 occurs during the insertion of the gain medium 104 within the cooling jacket 160. For instance, the coupling member 184 may initially be placed within the depression 180. The gain medium 104 is then inserted in the cooling jacket 160 until the coupling member 184 is received within the depression 182.

At 194, cooling fluid is circulated through the cooling cavity 160 of the cooling system 106. This is conducted in accordance with conventional techniques.

At 196, the gain medium 104 is excited through the application of pump energy 110 to either an end or side of the gain medium 104, as illustrated in FIG. 1. At 198, a laser beam 112 is generated by the gain medium 104 responsive to the excitation of the gain medium 104. At 200, the gain medium 104 is thermally expanded along the central axis 150 responsive to the excitation of the gain medium 104. At 202, the position of the depression 180 of the gain medium 104 relative to the depression 182 of the cooling jacket 160 is substantially maintained using the coupling member 184.

Further, as the gain medium 104 is cooled, the gain medium 104 thermally contracts. During such contraction, the position of the depression 180 of the gain medium 104 relative to the depression 182 of the cooling jacket 160 is maintained using the coupling member 184, thereby maintaining the gain medium 104 in the desired position relative to the cooling jacket.

Although the present invention has been described with reference to preferred embodiments, workers skilled in the art will recognize that changes may be made in form and detail without departing from the spirit and scope of the invention.

What is claimed is:

1. A laser resonator comprising:
a gain medium having a central axis, an outer surface, and two opposing end faces;
a cooling jacket including an inner surface and two opposing end portions, the cooling jacket being disposed around the gain medium to define a cooling cavity that receives radiation from the gain medium and guides a cooling fluid over the outer surface of the gain medium;
a first depression in the outer surface of the gain medium that is located in the cooling cavity, between the two opposing end faces of the gain medium;
a second depression in the inner surface of the cooling jacket that is located in the cooling cavity, between the two opposing end portions of the cooling jacket; and
a coupling member received in the cooling cavity within the first and second depressions to restrict movement of the first depression along the central axis relative to the second depression,
wherein the coupling member is exposed to the radiation in the cooling cavity and the two opposing end faces of the gain medium are movable along the central axis relative to the two opposing end portions of the cooling jacket.

2. The laser resonator of claim 1, wherein:
the first depression comprises a groove;
the second depression comprises a groove; and
the coupling member comprises an inner diameter portion received within the groove of the first depression, and an outer diameter portion received within the groove of the second depression.

3. The laser resonator of claim 2, wherein the groove of the first depression comprises an annular groove that is coaxial to the central axis.

4. The laser resonator of claim 3, wherein the annular groove is disposed at a central point of the gain medium.

5. The laser resonator of claim 3, wherein the coupling member forms a seal between the inner surface of the cooling jacket and the outer surface of the gain medium.

6. The laser resonator of claim 3, further comprising a seal engaging the outer surface of the gain medium and the inner surface of the cooling jacket at least one of the two opposing end portions of the cooling jacket to prevent the cooling fluid from escaping the cooling cavity.

7. The laser resonator of claim 3, wherein the annular groove of the second depression restricts movement of the coupling member along the central axis relative to the cooling jacket.

8. The laser resonator of claim 7, wherein the annular groove of the second depression is coaxial to the central axis.

9. A laser resonator comprising:
a gain medium having a central axis, an outer surface, and two opposing end faces;
a cooling jacket including an inner surface and two opposing end portions, the cooling jacket being disposed around the gain medium to define a cooling cavity that receives radiation from the gain medium and guides a cooling fluid over the outer surface of the gain medium;
a first annular groove in the outer surface of the gain medium that is located in the cooling cavity, between the two opposing end faces;
a second annular groove in the inner surface of the cooling jacket that is located in the cooling cavity, between the two opposing end portions; and
a coupling member received in the cooling cavity to restrict movement of the gain medium along the central axis, the coupling member having an inner diameter portion received within the first annular groove of the gain medium, and an outer diameter portion received within the second annular groove of the support member,
wherein the coupling member is exposed to the radiation in the cooling cavity and the two opposing end faces of the gain medium are movable along the central axis relative to the two opposing end portions of the cooling jacket.

10. The laser resonator of claim 9, wherein the coupling member forms a seal between the inner surface of cooling jacket and the outer surface of the gain medium.

11. The laser resonator of claim 9, further comprising a seal engaging, at location proximate to at least one of the two opposing end portions of the cooling jacket, the inner surface of the cooling jacket and the outer surface of the gain medium.

12. The laser resonator of claim 9, wherein:
the gain medium includes a central portion located in the cooling cavity, between the two opposing end faces;
the first annular groove is located in the central portion; and
the coupling member restricts movement of the central portion along the central axis relative to the two opposing end faces.

13. The laser resonator of claim 9, wherein the coupling member is resistant to the radiation in the cooling cavity.

14. A method comprising:
 positioning a laser resonator comprising:
  a gain medium having a central axis, an outer surface, and two opposing end faces;
  a cooling jacket having an inner surface and two opposing end portions, the cooling jacket being disposed around the gain medium to define a cooling cavity that receives radiation from the gain medium and guides a cooling fluid over the outer surface of the gain medium;
  a first depression in the outer surface of the gain medium that is located in the cooling cavity, between the two opposing end faces; and
  a second depression in the inner surface of the cooling jacket that is located in the cooling cavity, between the two opposing end portions;
 positioning a coupling member in the cooling cavity within the first and second depressions;
 circulating the cooling fluid through the cooling cavity;
 exciting the gain medium;
 generating a laser beam inside the laser resonator responsive to exciting the gain medium;
 thermally expanding the gain medium along the central axis responsive to exciting the gain medium; and
 maintaining the position of the first depression relative to the second depression of the cooling jacket using the coupling member,
 wherein the coupling member is exposed to the radiation in the cooling cavity and the two opposing end faces of the gain medium are movable along the central axis relative to the two opposing end portions of the cooling jacket.

15. The method of claim 14, wherein:
 the first depression is located adjacent a central portion of the gain medium; and
 thermally expanding the gain medium along the central axis responsive to exciting the gain medium comprises moving the two opposing end faces of the gain medium along the central axis relative to the two opposing end portions of the cooling jacket.

16. The method of claim 15, wherein:
 the first depression comprises a groove;
 the second depression comprises a groove; and
 positioning the coupling member within the first and second depressions comprises:
  positioning an inner diameter portion of the coupling member within the groove of the first depression; and
  positioning an outer diameter portion of the coupling member within the groove of the second depression.

17. The method of claim 16, wherein the groove of the first depression comprises an annular groove that is coaxial to the central axis.

18. The method of claim 17, wherein the groove of the second depression comprises an annular groove that is coaxial to the central axis.

19. The method of claim 16, further comprising the step of sealing the two opposing end portions of the cooling jacket.

20. The method of claim 19, wherein sealing the two opposing end portions of the cooling jacket comprises placing a seal between the outer surface of the gain medium and the inner surface of the cooling jacket at each of the two opposing end portions of the cooling jacket.

* * * * *